(12) United States Patent
Kim et al.

(10) Patent No.: US 12,670,581 B2
(45) Date of Patent: Jun. 30, 2026

(54) APPARATUS AND METHOD FOR DETECTING DEFECT USING DEEP LEARNING-BASED SURFACE INSPECTION

(71) Applicant: Pusan National University Industry-University Cooperation Foundation, Busan (KR)

(72) Inventors: Jongdeok Kim, Busan (KR); Donghyun Kim, Busan (KR); Seungho Lee, Busan (KR); Changhong Lee, Busan (KR); Jaemin Lee, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 308 days.

(21) Appl. No.: 18/517,839

(22) Filed: Nov. 22, 2023

(65) Prior Publication Data

US 2024/0177297 A1 May 30, 2024

(30) Foreign Application Priority Data

Nov. 24, 2022 (KR) ........................ 10-2022-0159696

(51) Int. Cl.
*G06T 7/00* (2017.01)
*G06T 5/50* (2006.01)
*G06T 5/70* (2024.01)

(52) U.S. Cl.
CPC ................ *G06T 7/001* (2013.01); *G06T 5/50* (2013.01); *G06T 5/70* (2024.01);
(Continued)

(58) Field of Classification Search
CPC .. G06T 7/001; G06T 5/50; G06T 5/70; G06T 2207/20021; G06T 2207/20081; G06T 2207/20212; G06T 2207/30108; G06T 2207/30168; G06T 2207/20084; G06T 2207/30148; G06T 7/0004; G06T 7/11;
(Continued)

(56) References Cited

U.S. PATENT DOCUMENTS

2022/0414833 A1* 12/2022 Fukuda ..................... G06T 5/70
2024/0135689 A1* 4/2024 Sugasawa ............ G06V 10/141

FOREIGN PATENT DOCUMENTS

CN       114724043 A  *  7/2022  ........... G06F 18/214
KR       10-1782363 B1     9/2017
(Continued)

*Primary Examiner* — Jose L Couso
(74) *Attorney, Agent, or Firm* — Paratus Law Group, PLLC

(57) ABSTRACT

An apparatus for detecting defects using deep learning-based surface inspection, includes: a normal image-based unsupervised training unit configured to, based on a normal image, train a reconstructive sub-network which allows an original image to be obtained through an image with noise inserted, and a discriminative sub-network which allows detection of a noise area; and a defective image-based online supervised training unit configured to, based on a defective image, train a reconstructive sub-network which inputs an inspection target image to generate a flaw removal image, and a discriminative sub-network which extracts a flaw area image by comparing a difference between the inspection target image and the flaw removal image.

16 Claims, 13 Drawing Sheets

(52) U.S. Cl.

CPC ............... *G06T 2207/20021* (2013.01); *G06T 2207/20081* (2013.01); *G06T 2207/20212* (2013.01); *G06T 2207/30108* (2013.01); *G06T 2207/30168* (2013.01)

(58) Field of Classification Search

CPC ......... G06T 3/4046; G06T 5/60; G06T 9/002; G06T 2207/20076; G06T 5/20; G06T 7/002; G06T 1/0014; G06T 7/00; G06N 3/045; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06V 10/82; G06V 20/52; G06V 10/454; G06V 10/54; G06V 10/7764; G06V 10/774; G06V 10/84; G06V 20/41; G06V 30/18057; G06V 20/698; G06V 30/19173; G06V 30/194; G06V 10/16; G06V 10/20; G06V 10/30; G06V 10/34; G06V 10/776; G06V 10/993; G06V 10/74; G06V 10/761; G06V 10/764; G01N 2021/8883; G01N 21/8851; G01N 2021/8854; G01N 2021/8887; G01N 2021/88; G01N 21/8806; G01N 2021/8809; G01N 2021/8851; G06K 7/1482; G06F 18/213; G06F 18/214; G06F 18/22; G06F 18/241; G06F 18/24; G06F 18/2411; G06F 18/2415; G06F 18/253; G06F 30/27; Y10S 128/925; B33Y 50/00

See application file for complete search history.

(56) References Cited

FOREIGN PATENT DOCUMENTS

| KR | 10-2021-0050168 A | | 5/2021 | |
|----|-------------------|---|--------|----------------|
| KR | 10-2022-0050083 A | | 4/2022 | |
| TW | 201732305 A | * | 9/2017 | ............. G06T 7/001 |
| TW | 1707139 B | * | 10/2020 | ....... G01N 21/95607 |
| TW | 202233436 A | * | 9/2022 | ........... G06T 3/4053 |
| TW | 202403603 A | * | 1/2024 | ............. G06T 7/001 |
| WO | WO-2018225745 A1 | * | 12/2018 | ............. G06T 7/001 |
| WO | WO-2019188040 A1 | * | 10/2019 | ........... G06T 7/0008 |

\* cited by examiner

FIG. 1
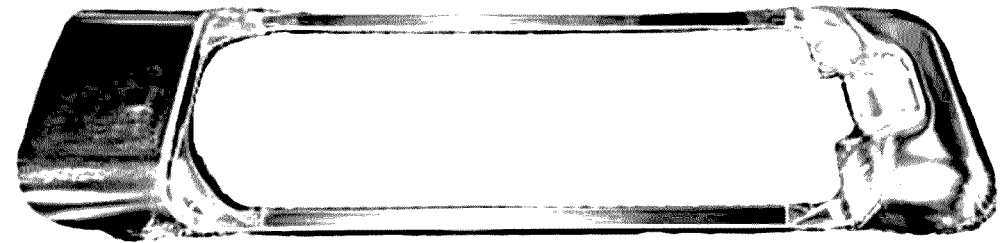
Production product: Décor Frame
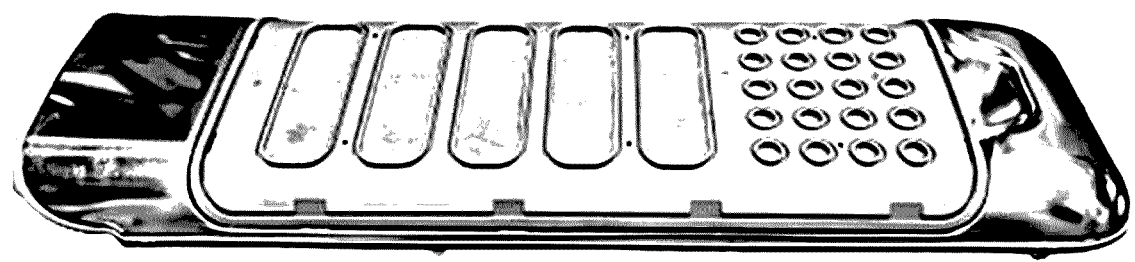
Décor Frame Assembly

FIG.2
1. Plate material
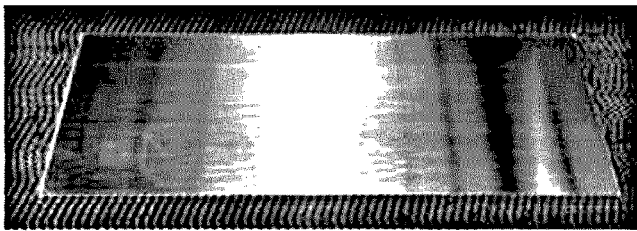
2. Barcode (Data Matrix)
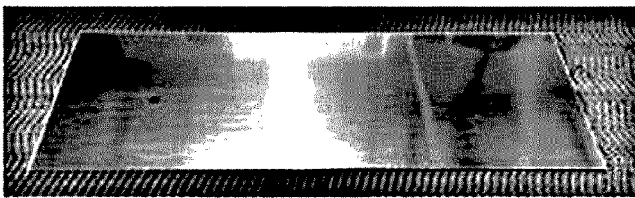
3. Press 1 process
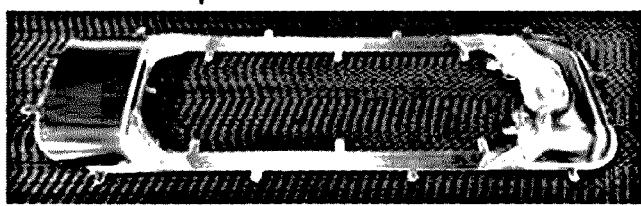
4. Scrap
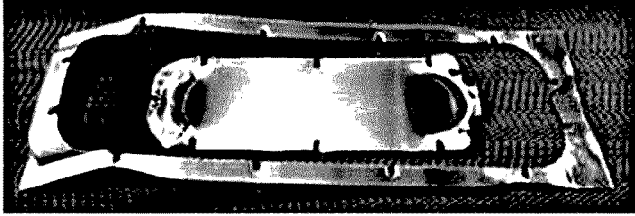
5. Press 2 process
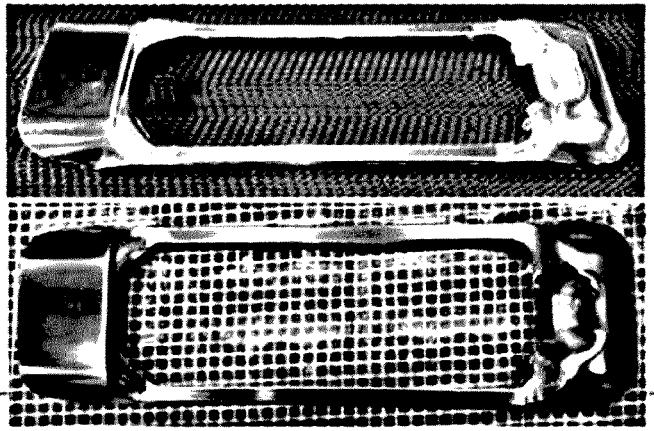

FIG.3

Second press process
Chip (vinyl foreign body) (Hook)

First press process
Bursting (Sleeve) (Necking) (Burr)

FIG.4

| Abb. | Reflectivity | Roughness | | | Inclination | | |
|---|---|---|---|---|---|---|---|
| | REF | Horizontal | Vertical | Absolute | Horizontal | Vertical | Absolute |
| | | RGH | RGV | RG2 | INH | INV | IN2 |
| Representative images | | | | | | | |
| Explanation | Amount of reflection | Amount of roughness in horizontal direction | Amount of roughness in vertical direction | Amount of roughness without directional information | Amount of inclination in horizontal direction | Amount of inclination in vertical direction | Amount of inclination without directional information |
| Effective detections | Reflectivity changing such as stain, fading, color difference, etc | Horizontal roughness changing such as vertical scratch and comb patterns | Vertical roughness changing such as horizontal scratch and comb patterns | Defects to detect regardless directional characteristics in terms of roughness changing such as scratch and sanding | Horizontal inclination changing such as vertical dent and extrusion | Vertical inclination changing such as horizontal dent and extrusion | Defects to detect regardless directional characteristics in terms of inclination changing such as dent and extrusion |

APPARATUS AND METHOD FOR DETECTING DEFECT USING DEEP LEARNING-BASED SURFACE INSPECTION

ACKNOWLEDGEMENT OF GOVERNMENT SUPPORT

This research was supported by the MSIT (Ministry of Science and ICT), Republic of Korea, under the ITRC (Information Technology Research Center) program (IITP-2022-2016-0-00318 and IITP-2023-RS-2023-00260098) supervised by the IITP (Institute for Information & communications Technology Planning & Evaluation) of Republic of Korea.

CROSS-REFERENCE TO RELATED APPLICATION

This application claims priority to Korean Patent Application No. 10-2022-0159696 (filed on Nov. 24, 2022), which is hereby incorporated by reference in its entirety.

BACKGROUND

The present disclosure relates to deep learning-based surface inspection, and more specifically, to an apparatus and a method for detecting defects using deep learning-based surface inspection by which inspection accuracy is improved by using normal images to train a model that removes flaws from an image, then selecting defective images among images determined by the model and supplementing training performance with online learning.

In general, various types of defect inspections are performed on product production lines.

A product production line to produce one product includes multiple processes such as injection process, plate process, sub-assembly process, and total assembly process, and vision inspection is performed on the results of each process, such as parts manufactured through injection or plate molding, sub-parts produced through the assembly process of the parts, and products produced through the total assembly process.

However, the results are different for each process, so the form of the image to be used as training data is different, and even for the same defect type, the form of the defect may be different depending on the result, and the background result itself is also different, resulting in a different form of the image, so in theory, each training model should be created and applied according to the results of each process and the type of defect.

FIG. 1 is a configuration diagram illustrating a structure of a general decor frame.

Here, the decor frame is attached to the inside of the washing machine's cylinder and serves to evenly mix the laundry. This product is produced by press equipment applying pressure to the material. Therefore, defective products generated from press equipment may be produced.

FIG. 2 is a configuration diagram illustrating a decor frame production process sequence.

The production of the decor frame consists of two press processes.

The first process consists of drawing, trimming, and piercing. The second process is bending, which bends the joint.

Figure 3:
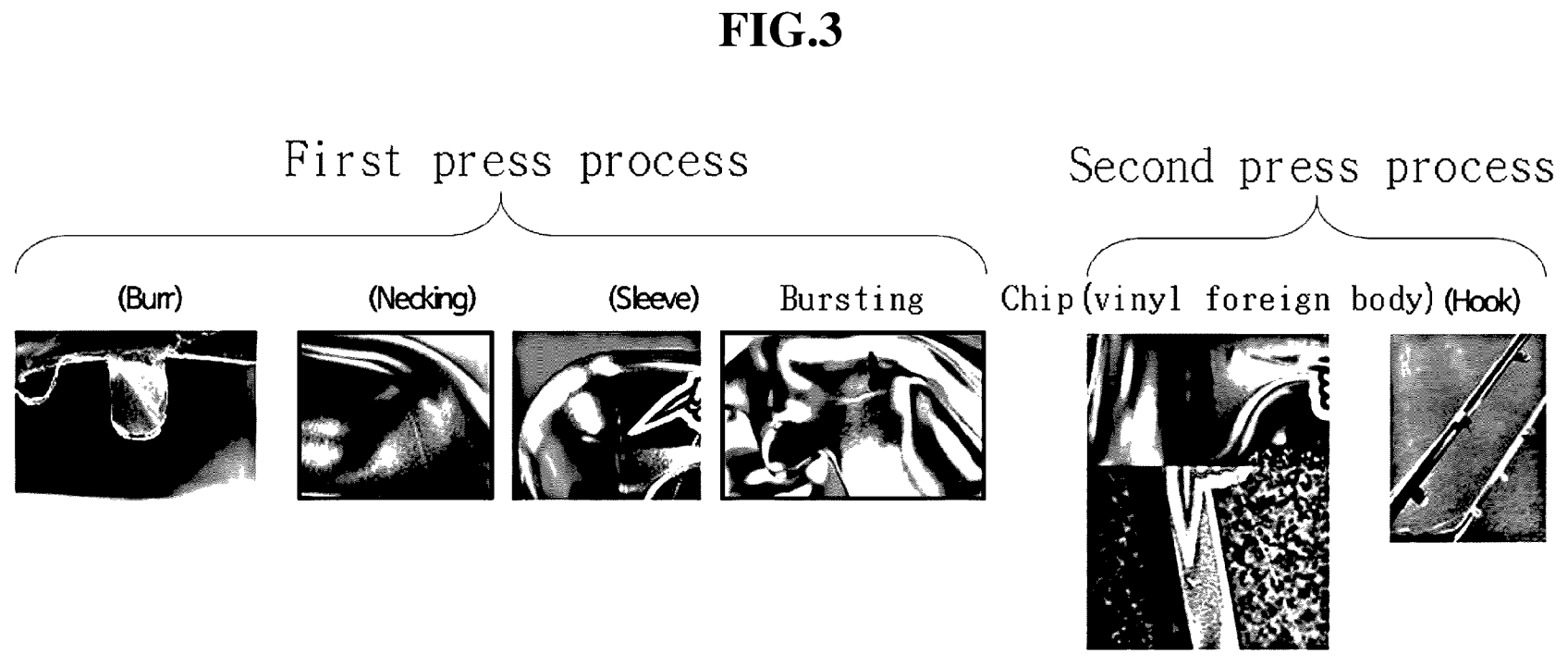

FIG. 3 is a configuration diagram illustrating items subject to surface inspection during a decor frame production process.

Defects that occur when producing a product are as shown in FIG. 3.

In the first press process, defects such as burrs, necking, sleeves, and bursting occur. In the second press process, chip and hook defects occur.

The defect rate of products occurring in the process is approximately 2.65%. In particular, chips account for 1.89%, which is 71% of all defective processes. Defects that occur on the product surface are detected through surface inspection, and the corresponding defect types are necking, sleeve, bursting, and chip.

FIG. 4 is a configuration diagram illustrating surface inspection and properties by lighting.

Computer vision-based surface inspection observes reflectivity, roughness, and inclination. The currently constructed system determines defects in decor frame products by observing the inclination during surface inspection.

FIG. 5 is a configuration diagram illustrating an example of a surface inspection sample.

When training a computer vision-based defect detection model in a smart factory during the production of such decor frames, the very small amount of defective data compared to normal data is one of the major limitations in improving training performance.

As such, the amount of training data, especially the amount of defective data, is inevitably relatively small, and the judgment accuracy of a new learning model created by training with a small amount of training data is inevitably low.

In particular, supervised learning-based defect detection models take a lot of time to collect a very small number of defective data, and while unsupervised learning-based defect detection models have solved the difficulty of securing training data, it is difficult to guarantee performance compared to supervised learning.

Accordingly, there is a need for the development of new technologies to resolve the difficulty in securing training data and improve inspection accuracy by supplementing training performance.

PRIOR-ART DOCUMENTS

Patent Documents (Patent Document 1) Korean Patent No. 10-1782363
(Patent Document 2) Korean Patent Application Publication No. 10-2022-0050083
(Patent Document 3) Korean Patent Application Publication No. 10-2021-0050168

SUMMARY

The present disclosure is intended to solve the problems of the product surface inspection technology of the prior art, and an object is to provide an apparatus and method for detecting defects using deep learning-based surface inspection which improves inspection accuracy by using normal images to train a model that removes flaws from an image, and then selecting defective images from among images determined by the model to supplement training performance with online learning.

An object of the present disclosure is to provide an apparatus and method for detecting defects using deep learning-based surface inspection to secure the performance of a defect detection model above a certain level through unsupervised learning and to utilize the effects of both unsupervised learning and supervised learning by supplementing the performance of the model with supervised learning-based online learning.

An object of the present disclosure is to provide an apparatus and method for detecting defects using deep learning-based surface inspection which improves inspection accuracy by removing flaws from the surface inspection image and comparing the original and restored images in order to determine product defects, and determining that the product is defective if the difference between the original and the restored image is large, and in the opposite case, determining it to be normal.

An object of the present disclosure is to provide an apparatus and method for detecting defects using deep learning-based surface inspection which may be universally applied to all manufacturing processes that conduct surface abnormality inspection by utilizing the effects of both unsupervised learning and supervised learning to accurately detect even types of defects that are never seen before.

Other objects of the present disclosure are not limited to the objects mentioned above, and other objects not mentioned will be clearly understood by those skilled in the art from the description below.

In an apparatus for detecting defects using deep learning-based surface inspection according to the present disclosure to achieve the above objects, an electronic device including at least one processor for detecting defects using deep learning-based surface inspection, includes: a normal image-based unsupervised training unit configured to, based on a normal image, train a reconstructive sub-network which allows an original image to be obtained through an image with noise inserted, and a discriminative sub-network which allows detection of a noise area; and a defective image-based online supervised training unit configured to, based on a defective image, train a reconstructive sub-network which inputs an inspection target image to generate a flaw removal image, and a discriminative sub-network which extracts a flaw area image by comparing a difference between the inspection target image and the flaw removal image.

Here, the normal image-based unsupervised training unit may include an anomaly generation unit configured to insert noise into a normal product image to generate a defective product image, a reconstructive sub-network calculation unit configured to convert the defective product image into a normal product image, and a discriminative sub-network calculation unit configured to extract a defective area by comparing a difference between the defective product image synthesized and the normal product image.

In addition, the anomaly generation unit may include a Perlin noise generation unit configured to, when the normal product image is input, generate Perlin noise equal in size to the normal product image, a noise area image extraction unit configured to extract a noise area image using a threshold, and a data synthesis unit configured to synthesize the normal product image and noise data.

In addition, the reconstructive sub-network calculation unit may include a flaw removal image generation unit configured to receive the defective product image synthesized in the anomaly generation unit as an input to output a flaw removal image of the same size as the defective product image through reconstructive sub-network calculation, an image difference calculation unit configured to calculate a difference between the flaw removal image and the normal product image, and an image concatenation unit configured to concatenate the flaw removal image and a defective image.

In addition, the discriminative sub-network calculation unit may include a flaw area image generation unit configured to receive a defective product image and a normal product image concatenated as an input to generate a flaw area image of the same size as a product image through discriminative sub-network calculation, an image difference calculation unit configured to calculate a difference between the flaw area image and a noise area image, and a weight correction unit configured to correct weights of the reconstructive sub-network and the discriminative sub-network, using differences calculated from the reconstructive sub-network and the discriminative sub-network, respectively.

In addition, the defective image-based online supervised training unit may include a reconstructive sub-network calculation unit configured to input the inspection target image to generate the flaw removal image, a discriminative sub-network calculation unit configured to extract the flaw area image by comparing the difference between the inspection target image and the flaw removal image, a defective product detection and training unit configured to calculate whether the flaw area image is defective, detect a defective product and train based on a threshold to perform binarization of the flaw area image, and calculate a difference between a binarized image and the flaw area image to correct a weight of the discriminative sub-network.

In addition, the reconstructive sub-network calculation unit may include a flaw removal image generation unit configured to receive the inspection target image as an input to generate the flaw removal image, and an image concatenation unit configured to concatenate the inspection target image and the flaw removal image.

In addition, the discriminative sub-network calculation unit may include a flaw area image generation unit configured to receive an inspection target image and a flaw removal image concatenated as an input to generate a flaw area image of the same size as a product image through discriminative sub-network calculation, and a defect calculation unit configured to calculate whether the flaw area image is defective.

In addition, the defective product detection and training unit may include an image binarization unit configured to detect a defective product and train based on a threshold to perform binarization of the flaw area image, an image difference calculation unit configured to calculate a difference between a binarized image and the flaw area image, and a weight correction unit configured to correct the weight of the discriminative sub-network based on the calculated difference between the binarized image and the flaw area image.

A method for detecting defects using deep learning-based surface inspection according to the present disclosure to achieve another object, in which an operation for detecting defects using deep learning-based surface inspection is performed in an electronic device including at least one processor, includes: a normal image-based unsupervised training step of, based on a normal image, training a reconstructive sub-network which allows an original image to be obtained through an image with noise inserted, and a discriminative sub-network which allows detection of a noise area; and a defective image-based online supervised training step of, based on a defective image, training a reconstructive sub-network which inputs an inspection target image to generate a flaw removal image, and a discriminative sub-network which extracts a flaw area image by comparing a difference between the inspection target image and the flaw removal image.

Here, the normal image-based unsupervised training step may include an anomaly generating step of inserting noise into a normal product image to generate a defective product image, a reconstructive sub-network calculating step of converting the defective product image into a normal product image, and a discriminative sub-network calculating step of extracting a defective area by comparing a difference between the defective product image synthesized and the normal product image.

In addition, the anomaly generating step may include a Perlin noise generating step of, when the normal product image is input, generating Perlin noise equal in size to the normal product image, a noise area image extracting step of extracting a noise area image using a threshold, and a data synthesizing step of synthesizing the normal product image and noise data.

In addition, the reconstructive sub-network calculating step may include a flaw removal image generating step of receiving the defective product image synthesized in the anomaly generating step as an input to output a flaw removal image of the same size as the defective product image through reconstructive sub-network calculation, an image difference calculating step of calculating a difference between the flaw removal image and the normal product image, and an image concatenating step of concatenating the flaw removal image and a defective image.

In addition, the discriminative sub-network calculating step may include a flaw area image generating step of receiving a defective product image and a normal product image concatenated as an input to generate a flaw area image of the same size as a product image through discriminative sub-network calculation, an image difference calculating step of calculating a difference between the flaw area image and a noise area image, and a weight correcting step of correcting weights of the reconstructive sub-network and the discriminative sub-network, using differences calculated from the reconstructive sub-network and the discriminative sub-network, respectively.

In addition, the defective image-based online supervised training step may include a reconstructive sub-network calculating step of inputting the inspection target image to generate the flaw removal image, a discriminative sub-network calculating step of extracting the flaw area image by comparing the difference between the inspection target image and the flaw removal image, and a defective product detecting and training step of calculating whether the flaw area image is defective, detect a defective product and train based on a threshold to perform binarization of the flaw area image, and calculate a difference between a binarized image and the flaw area image to correct a weight of the discriminative sub-network.

In addition, the reconstructive sub-network calculating step may include a flaw removal image generating step of receiving the inspection target image as an input to generate the flaw removal image, and an image concatenating step of concatenating the inspection target image and the flaw removal image.

In addition, the discriminative sub-network calculating step may include a flaw area image generating step of receiving an inspection target image and a flaw removal image concatenated as an input to generate a flaw area image of the same size as a product image through discriminative sub-network calculation, and a defect calculating step of calculating whether the flaw area image is defective.

In addition, the defective product detecting and training step may include an image binarization step of detecting a defective product and train based on a threshold to perform binarization of the flaw area image, an image difference calculating step of calculating a difference between a binarized image and the flaw area image, and a weight correcting step of correcting the weight of the discriminative sub-network based on the calculated difference between the binarized image and the flaw area image.

As described above, an apparatus and method for detecting defects using deep learning-based surface inspection according to the present disclosure have the following effects.

First, normal images are used to train a model that removes flaws from an image, and then defective images are selected among the images determined by the model and the training performance is supplemented with online learning to improve inspection accuracy.

Second, the performance of the defect detection model is secured to a certain level or higher through unsupervised learning, and the performance of the model is supplemented with supervised learning-based online learning to utilize the effects of both unsupervised and supervised learning.

Third, in order to determine product defects, flaws are removed from the surface inspection image and the original and restored images are compared, and if the difference between the original and the restored image is large, the product is determined to be defective, and in the opposite case, it is determined to be normal so as to increase inspection accuracy.

Fourth, by utilizing the effects of both unsupervised learning and supervised learning, even types of defects never seen before can be accurately detected, making it universally applicable to all manufacturing processes that conduct surface abnormality inspection.

BRIEF DESCRIPTION OF THE DRAWINGS

FIG. 1 is a configuration diagram illustrating a structure of a general decor frame.

FIG. 2 is a configuration diagram illustrating a decor frame production process sequence.

FIG. 3 is a configuration diagram illustrating items subject to surface inspection during a decor frame production process.

FIG. 4 is a configuration diagram illustrating surface inspection and properties by lighting.

FIG. 15 is a configuration diagram illustrating a normal image-based unsupervised training process.

FIG. 18 is a configuration diagram illustrating a defective image-based online supervised training process.

DETAILED DESCRIPTION

Hereinafter, a preferred embodiment of an apparatus and method for detecting defects using deep learning-based surface inspection according to the present disclosure will be described in detail as follows.

The features and advantages of an apparatus and method for detecting defects using deep learning-based surface inspection according to the present disclosure will become apparent through the detailed description of each embodiment below.

Figure 5:
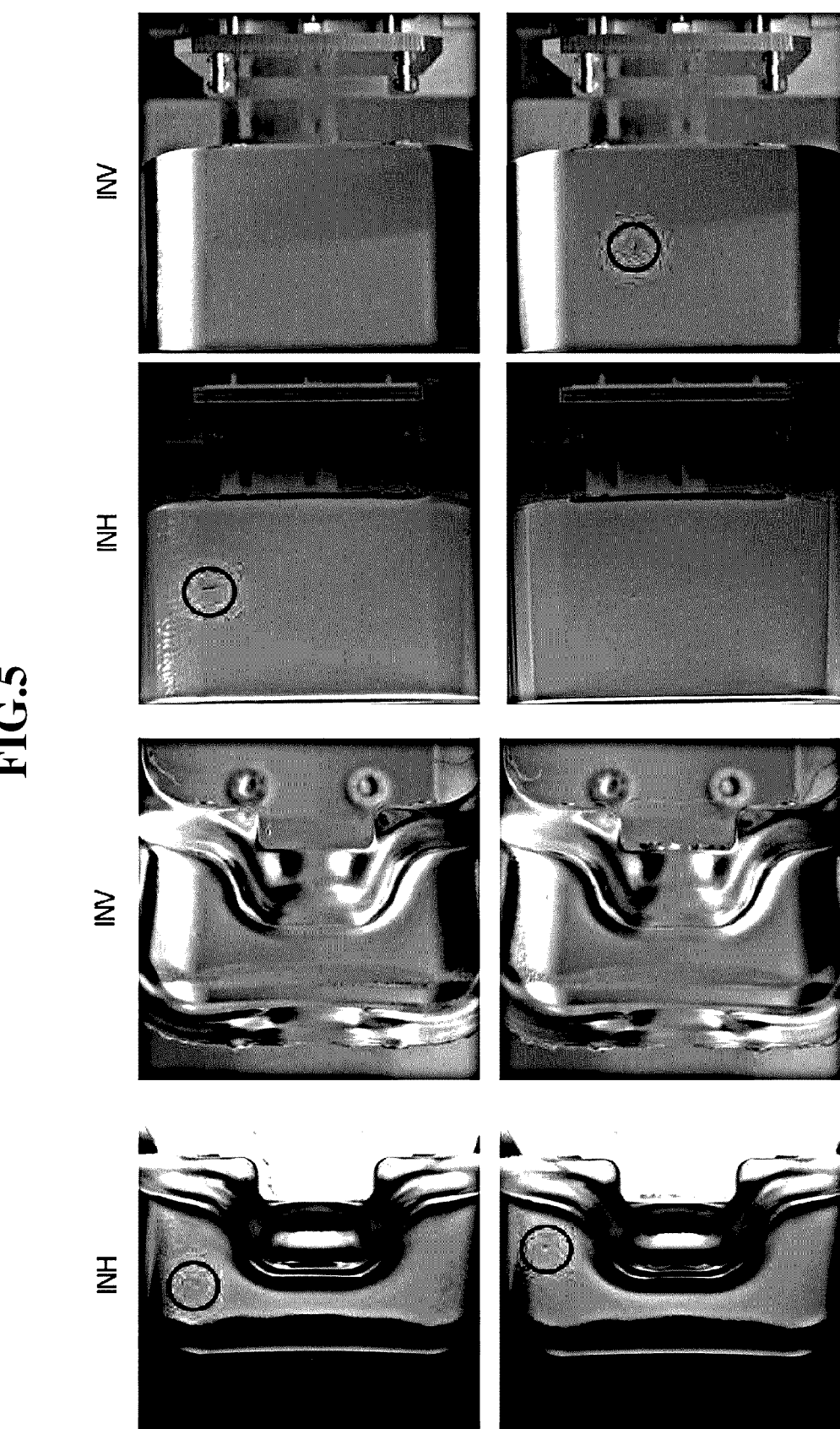
FIG. 5 is a configuration diagram illustrating an example of a surface inspection sample.
Figure 6:
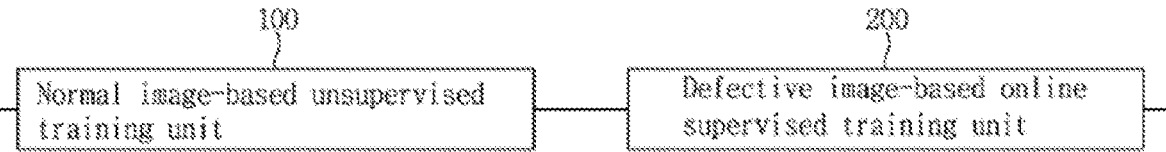
FIG. 6 is a configuration diagram of an apparatus for detecting defects using deep learning-based surface inspection according to the present disclosure.

FIG. 6 is a configuration diagram of an apparatus for detecting defects using deep learning-based surface inspection according to the present disclosure.

The terms used in the present disclosure have selected general terms that are currently widely used as much as possible while considering the functions in the present disclosure, but this may vary depending on the intention or precedents of those skilled in the art, the emergence of new technologies, etc. In addition, in certain cases, there are terms arbitrarily selected by the applicant, and in this case, the meaning will be described in detail in the relevant detailed description. Therefore, the terms used in the present disclosure should be defined based on the meaning of the term and the overall content of the present disclosure, rather than simply the name of the term.

When it is said that a part "includes" a certain element throughout the specification, this means that, unless specifically stated to the contrary, it does not exclude other elements but may further include other elements. In addition, terms such as " . . . unit" and "module" used in the specification refer to a unit that processes at least one function or operation, which may be implemented as hardware or software, or as a combination of hardware and software.

In particular, units that process at least one function or operation may be implemented with at least one processor, and at least one electronic device may be connected to the processor depending on the method of processing the function or operation. Electronic devices may include data input devices, data output devices, and data storage devices.

The apparatus and method for detecting defects using deep learning-based surface inspection according to the present disclosure uses normal images to train a model that removes flaws from the image, and then selects defective images among the images determined by the model to improve inspection accuracy by supplementing the training performance with online learning.

To this end, the present disclosure may include a configuration that allows to utilize the effects of both unsupervised learning and supervised learning by securing the performance of the defect detection model above a certain level through unsupervised learning, and supplementing the performance of the model with supervised learning-based online learning.

The present disclosure may include, in order to improve the inspection accuracy, a configuration that removes flaws from the surface inspection image and compares the original and restored images to determine product defects, and if the difference between the original and the restored image is large, determines the product to be defective, and in the opposite case, determines it to be normal.

The present disclosure may include a configuration that allows for universal applicability to all manufacturing processes that conduct surface abnormality inspection by utilizing the effects of both unsupervised learning and supervised learning to accurately detect even types of defects never seen before.

In the following description, the inspection target product to which the apparatus and method for detecting defects using deep learning-based surface inspection according to the present disclosure is applied using a decor frame as an example, but the surface inspection target product is not limited thereto.

The apparatus and method for detecting defects using deep learning-based surface inspection according to the present disclosure includes, as shown in FIG. 6, a normal image-based unsupervised training unit 100 configured to, based on a normal image, train a reconstructive sub-network which allows an original image to be obtained through an image with noise inserted, and a discriminative sub-network which allows detection of a noise area, and a defective image-based online supervised training unit 200 configured to, based on a defective image, train a reconstructive sub-network which inputs an inspection target image to generate a flaw removal image, and a discriminative sub-network which extracts a flaw area image by comparing a difference between the inspection target image and the flaw removal image.

The detailed configuration of the normal image-based unsupervised training unit 100 is as follows.

Figure 7:
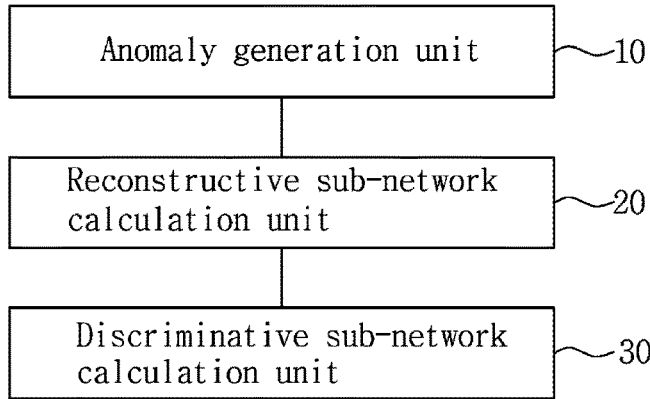
FIG. 7 is a detailed configuration diagram of a normal image-based unsupervised training unit.

FIG. 7 is a detailed configuration diagram of a normal image-based unsupervised training unit.

As shown in FIG. 7, the normal image-based unsupervised training unit 100 includes an anomaly generation unit 10 configured to insert noise into a normal product image to generate a defective product image, a reconstructive sub-network calculation unit 20 configured to convert the defective product image into a normal product image, and a discriminative sub-network calculation unit 30 configured to extract a defective area by comparing a difference between the defective product image synthesized and the normal product image.

The detailed configuration of the anomaly generation unit 10 is as follows.

Figure 8:
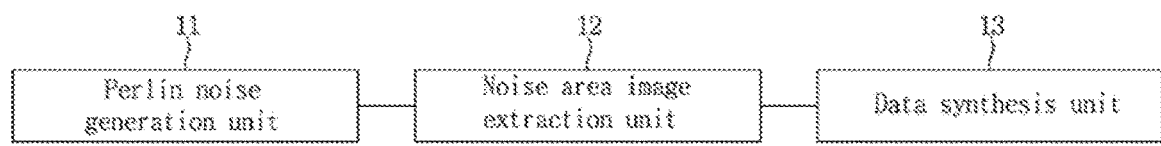
FIG. 8 is a detailed configuration diagram of an anomaly generation unit.

FIG. 8 is a detailed configuration diagram of an anomaly generation unit.

As shown in FIG. 8, the anomaly generation unit 10 includes a Perlin noise generation unit 11 configured to, when the normal product image is input, generate Perlin noise equal in size to the normal product image, a noise area image extraction unit 12 configured to extract a noise area image using a threshold, and a data synthesis unit 13 configured to synthesize the normal product image and noise data.

The detailed configuration of the reconstructive sub-network calculation unit 20 is as follows.

Figure 9:
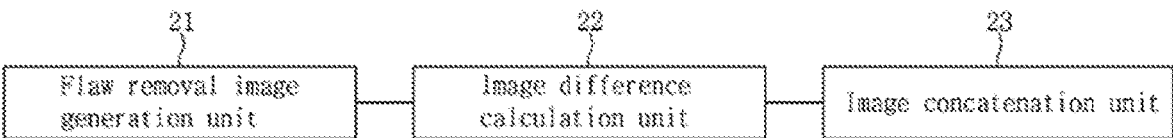
FIG. 9 is a detailed configuration diagram of a reconstructive sub-network calculation unit.

FIG. 9 is a detailed configuration diagram of a reconstructive sub-network calculation unit.

As shown in FIG. 9, the reconstructive sub-network calculation unit 20 includes a flaw removal image generation unit 21 configured to receive the defective product image synthesized in the anomaly generation unit 10 as an input to output a flaw removal image of the same size as the defective product image through reconstructive sub-network calculation, an image difference calculation unit 22 configured to calculate a difference between the flaw removal image and the normal product image, and an image concatenation unit 23 configured to concatenate the flaw removal image and a defective image.

The detailed configuration of the discriminative sub-network calculation unit 30 is as follows.

Figure 10:
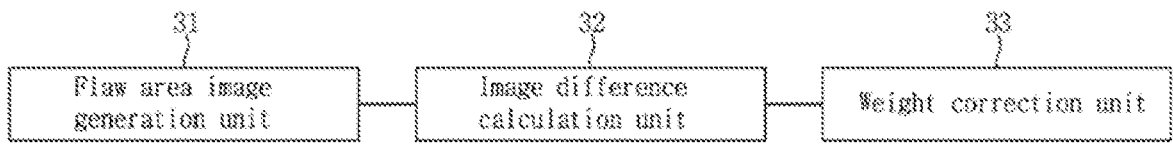
FIG. 10 is a detailed configuration diagram of a discriminative sub-network calculation unit.

FIG. 10 is a detailed configuration diagram of a discriminative sub-network calculation unit.

As shown in FIG. 10, the discriminative sub-network calculation unit 30 includes a flaw area image generation unit 31 configured to receive a defective product image and a normal product image concatenated as an input to generate a flaw area image of the same size as a product image through discriminative sub-network calculation, an image difference calculation unit 32 configured to calculate a difference between the flaw area image and a noise area image, and a weight correction unit 33 configured to correct weights of the reconstructive sub-network and the discriminative sub-network, using differences calculated from the reconstructive sub-network and the discriminative sub-network, respectively.

And the detailed configuration of the defective image-based online supervised training unit 200 is as follows.

Figure 11:
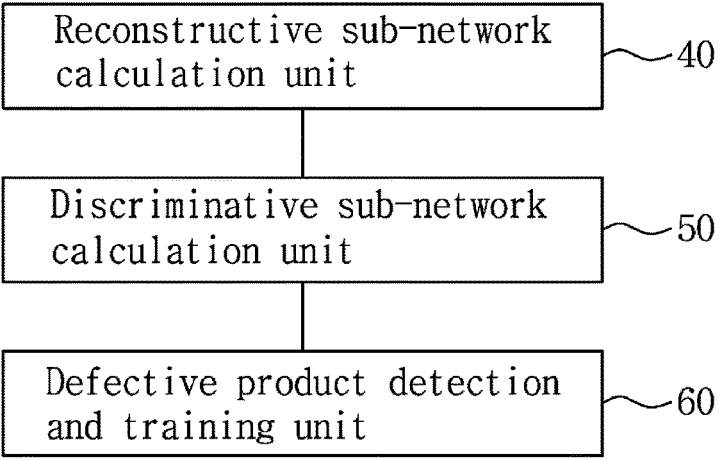
FIG. 11 is a detailed configuration diagram of a defective image-based online supervised training unit.

FIG. 11 is a detailed configuration diagram of a defective image-based online supervised training unit.

As shown in FIG. 11, the defective image-based online supervised training unit 200 includes a reconstructive sub-network calculation unit 40 configured to input an inspection target image to generate a flaw removal image, a discriminative sub-network calculation unit 50 configured to extract a flaw area image by comparing a difference between the inspection target image and the flaw removal image, and a defective product detection and training unit 60 configured to calculate whether the flaw area image is defective, detect a defective product and train based on a threshold to perform binarization of the flaw area image, and calculate a difference between a binarized image and the flaw area image to correct a weight of the discriminative sub-network.

The detailed configuration of the reconstructive sub-network calculation unit 40 is as follows.

Figure 12:
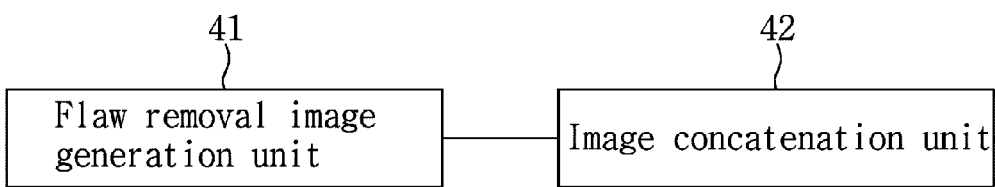
FIG. 12 is a detailed configuration diagram of a reconstructive sub-network calculation unit.

FIG. 12 is a detailed configuration diagram of a reconstructive sub-network calculation unit.

As shown in FIG. 12, the reconstructive sub-network calculation unit 40 includes a flaw removal image generation unit 41 configured to receive an inspection target image as an input to generate a flaw removal image, and an image concatenated unit 42 configured to concatenate the inspection target image and the flaw removal image.

The detailed configuration of the discriminative sub-network calculation unit 50 is as follows.

Figure 13:
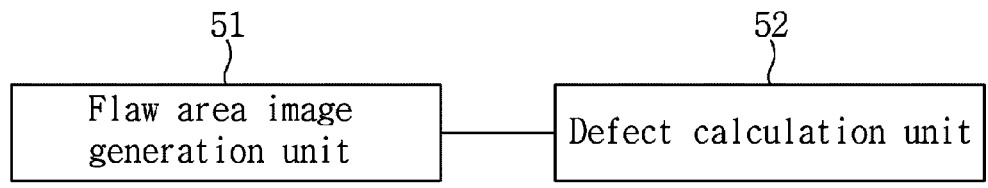
FIG. 13 is a detailed configuration diagram of a discriminative sub-network calculation unit.

FIG. 13 is a detailed configuration diagram of a discriminative sub-network calculation unit.

As shown in FIG. 13, the discriminative sub-network calculation unit 50 includes a flaw area image generation unit 51 configured to receive an inspection target image and a flaw removal image concatenated as an input to generate a flaw area image of the same size as a product image through discriminative sub-network calculation, a defect calculation unit 52 configured to calculate whether the flaw area image is defective.

The detailed configuration of the defective product detection and training unit 60 is as follows.

Figure 14:
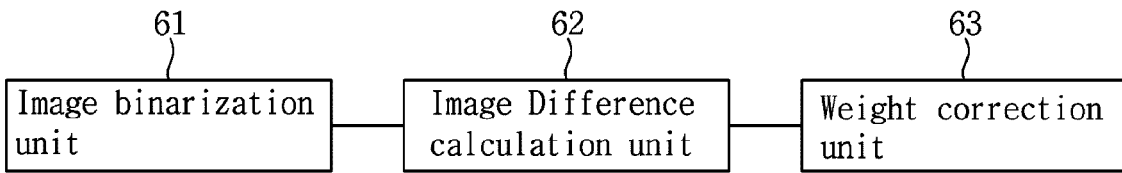
FIG. 14 is a detailed configuration diagram of a defective product detection and training unit.

FIG. 14 is a detailed configuration diagram of a defective product detection and training unit.

The defective product detection and training unit 60 includes an image binarization unit 61 configured to detect a defective product and train based on a threshold to perform binarization of a flaw area image, an image difference calculation unit 62 configured to calculate a difference between a binarized image and the flaw area image, and a weight correction unit 63 configured to correct a weight of the discriminative sub-network based on the calculated difference between the binarized image and the flaw area image.

A method for detecting defects using deep learning-based surface inspection according to the present disclosure is described in detail as follows.

A method for detecting defects using deep learning-based surface inspection according to the present disclosure, wherein an operation for detecting defects using deep learning-based surface inspection is performed in an electronic device including at least one processor, includes a normal image-based unsupervised training step of, based on a normal image, training a reconstructive sub-network which allows an original image to be obtained through an image with noise inserted, and a discriminative sub-network which allows detection of a noise area, and a defective image-based online supervised training step of, based on a defective image, training a reconstructive sub-network which inputs an inspection target image to generate a flaw removal image, and a discriminative sub-network which extracts a flaw area image by comparing a difference between the inspection target image and the flaw removal image.

The normal image-based unsupervised training step is described in detail as follows.

Figure 15:
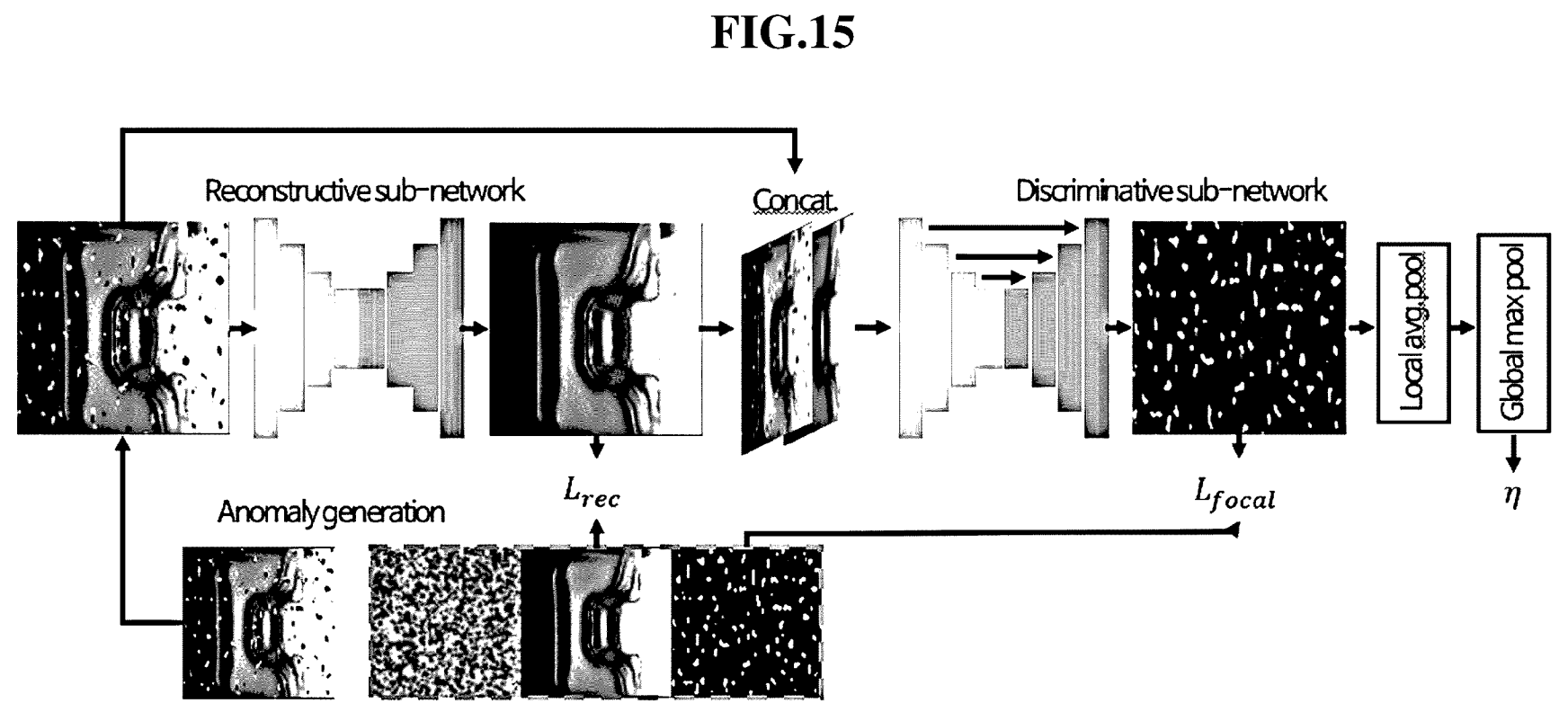
Figure 16:
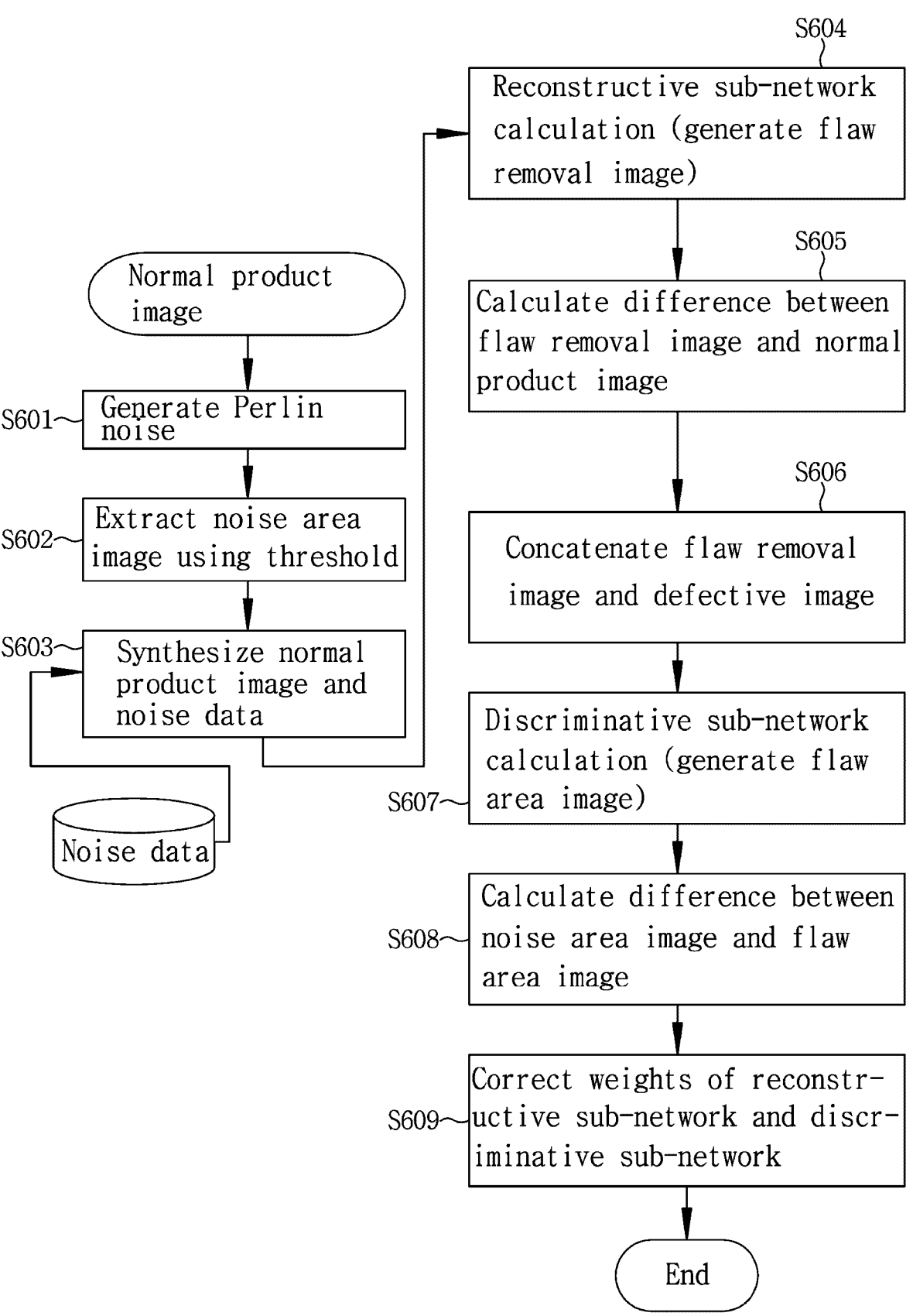
FIG. 16 is a flow chart illustrating a normal image-based unsupervised training method.

FIG. 15 is a configuration diagram illustrating a normal image-based unsupervised training process, and FIG. 16 is a flow chart illustrating a normal image-based unsupervised training method.

As shown in FIG. 15, in the normal image-based unsupervised training step, normal images are used to train the reconstructive sub-network and the discriminative sub-network.

The reconstructive sub-network is trained to obtain the original image by passing through the image with noise inserted. The discriminative sub-network is trained to detect the noise area.

The unsupervised training process according to the present disclosure is broadly divided into three processes: an anomaly generating process configured to insert noise to generate a defective product image, a reconstructive sub-network calculating process configured to convert the defective product image into a normal product image, and a discriminative sub-network calculating process configured to extract a defective area by comparing a difference between the defective product image synthesized and the normal product image.

This unsupervised training process performs training based on normal product data in an initial state where sufficient defective product data is not available.

First, when a normal product image is input, Perlin noise equal in size to the normal product image is generated (S601).

The Perlin noise image is binarized based on the threshold (S602).

When the value of one pixel of the Perlin noise image is between 0 and 1, the noise area image is an image that is 1 if the Perlin noise image is greater than the threshold based on the threshold (0.5), and 0 otherwise.

Next, in the synthesized defective product image, the 1 part of the noise area image is synthesized as noise data, and the 0 part is synthesized as a normal product image (S603).

Then, the synthesized defective product image is passed through the reconstructive sub-network to output a flaw removal image of the same size as the defective product image (S604).

Next, a difference ($L_{rec}$) between the flaw removal image and the normal product image is calculated (S605).

The small difference means that the reconstructive sub-network removed the flaws and generated a flaw removal image similar to the normal product image.

Then, the synthesized defective product image and the normal product image are concatenated (S606), input into the discriminative sub-network and a flaw area image of the same size as the product image is generated (S607).

Next, a difference ($L_{focal}$) between the flaw area image and the noise area image is calculated (S608).

The small difference means that the discriminative sub-network can find a difference between the defective product image and the normal product image and extract the defective area.

Then, the weights of the reconstructive sub-network and the discriminative sub-network are corrected, using the differences ($L_{rec}$) (and ($L_{focal}$) calculated from the two networks, respectively (S609).

Figure 17:
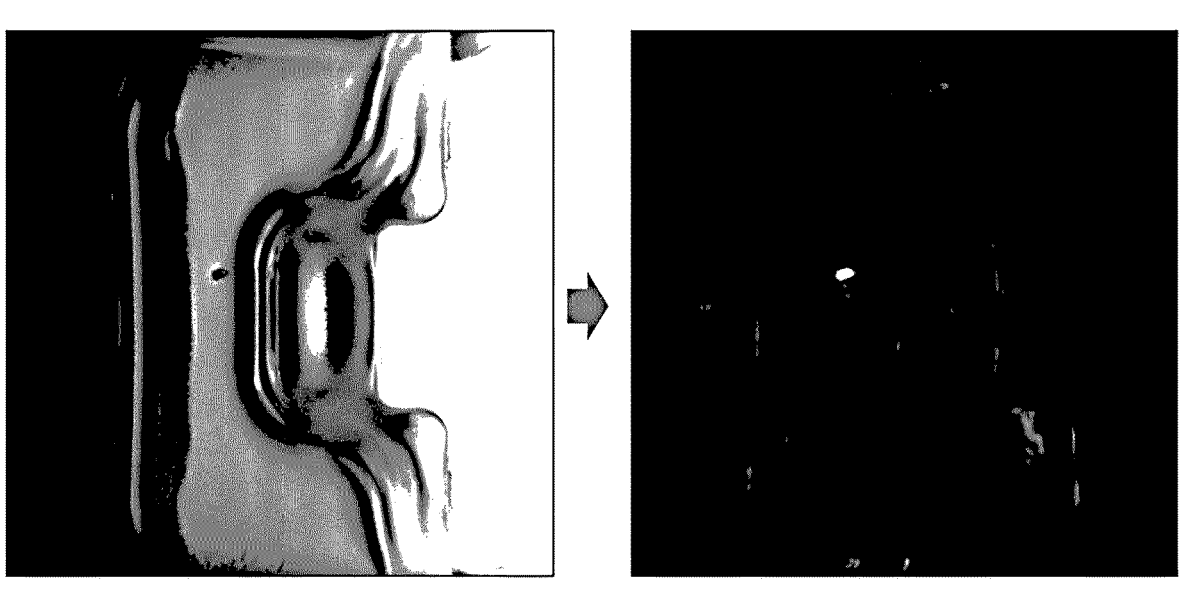
FIG. 17 is a configuration diagram illustrating an example of a successful defect detection case.

FIG. 17 is a configuration diagram illustrating an example of a successful defect detection case The detailed description of the defective image-based online supervised training step is as follows.

Figure 18:
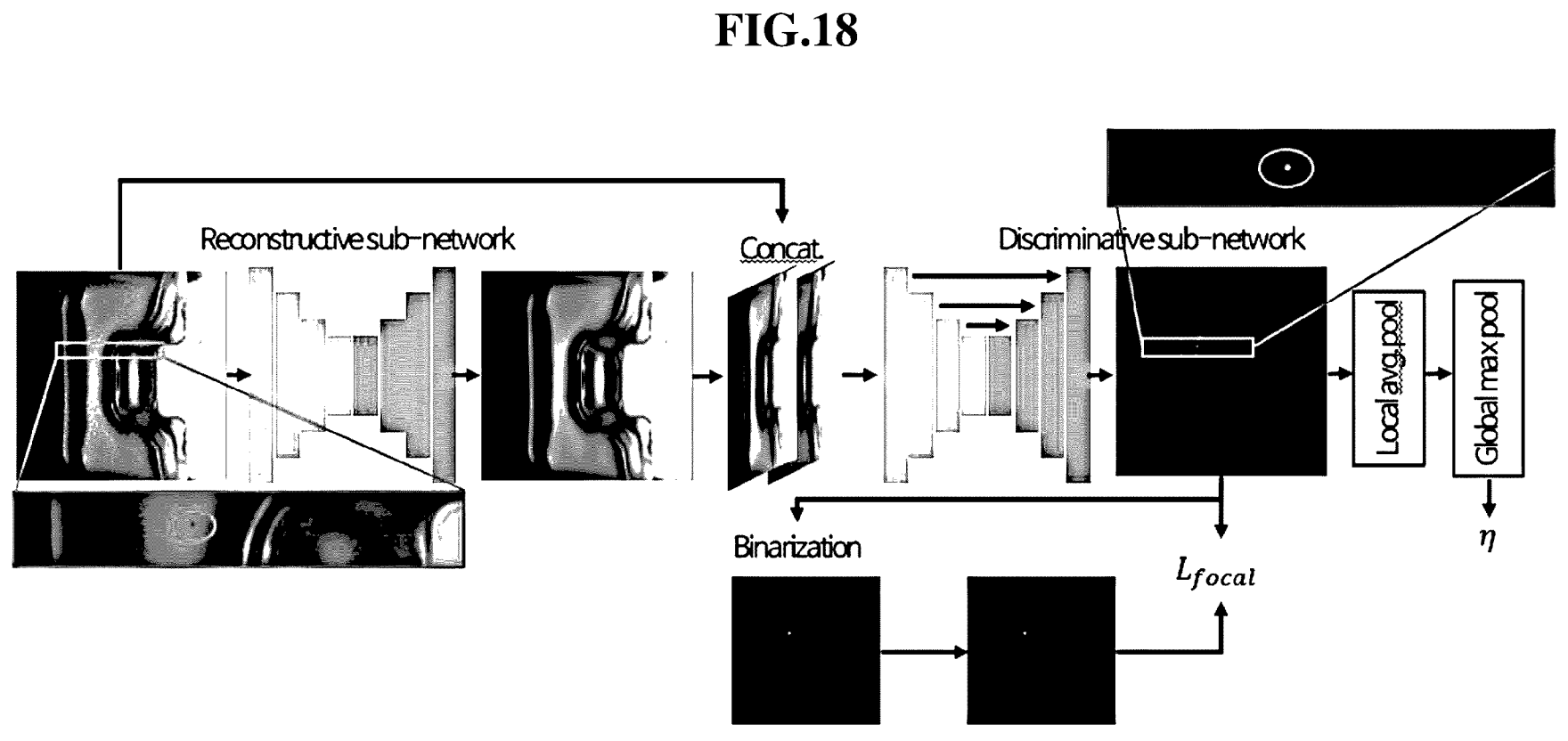
Figure 19:
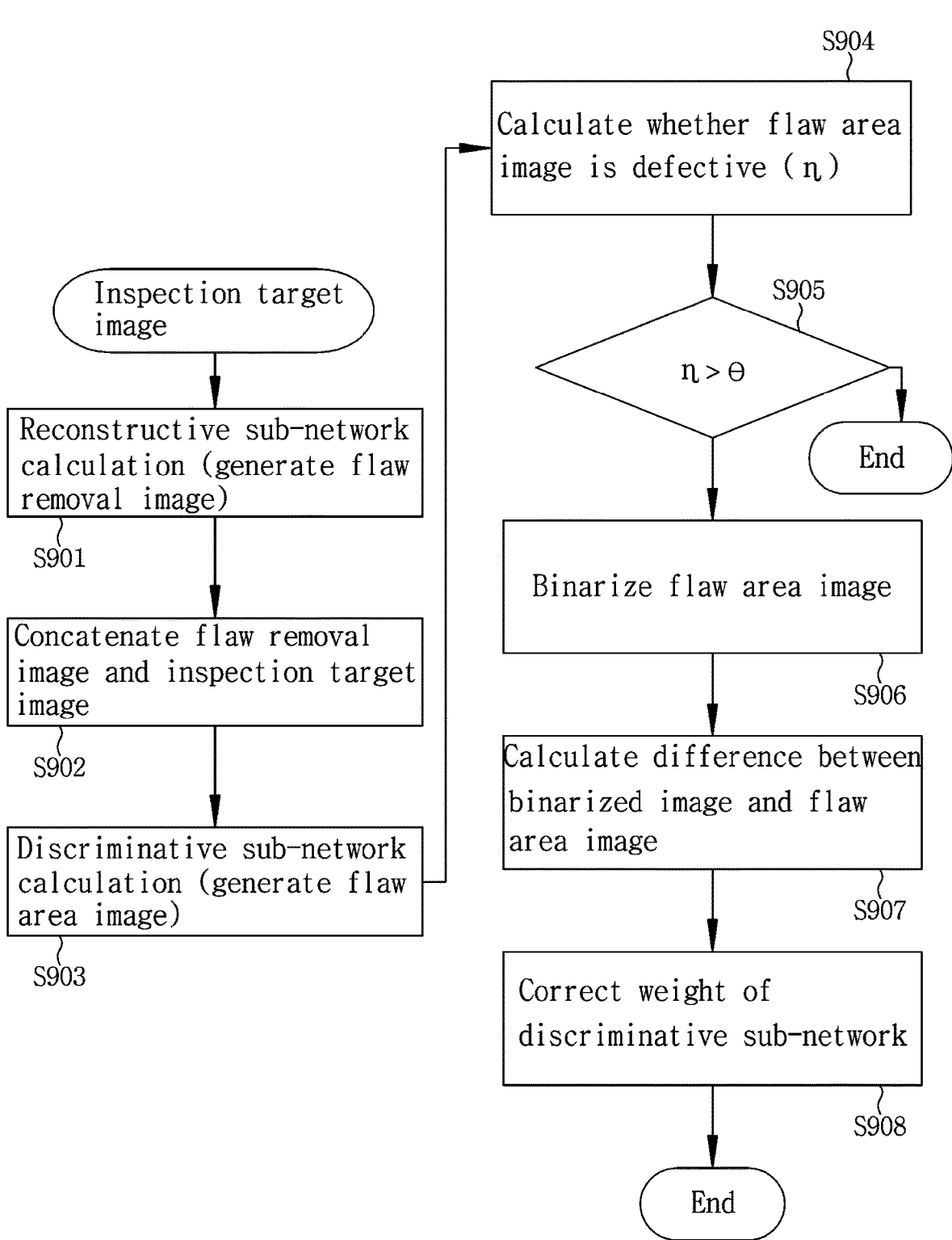
FIG. 19 is a flow chart illustrating a defective image-based online supervised training method.

FIG. 18 is a configuration diagram illustrating a defective image-based online supervised training process, and FIG. 19 is a flow chart illustrating a defective image-based online supervised training method.

As shown in FIG. 18, in the defective image-based online supervised training step, a defective image is used to train a discriminative sub-network.

If $\eta > \theta$, the image is determined to be a defective image and used for training the discriminative sub-network.

Binarization is performed on the defective area prediction image and the discriminative sub-network is updated through $L_{focal}$.

The online supervised training process according to the present disclosure first creates a model through unsupervised learning, and then the model is applied to actual fields and improves performance by training the model each time a defective product image is detected.

This process can be broadly divided into three processes: a reconstructive sub-network calculating process configured to input an inspection target image to generate a flaw removal image, a discriminative sub-network calculating process configured to extract a flaw area image by comparing a difference between the inspection target image and the flaw removal image, and a defective product detection and training process configured to perform binarization of the flaw area image and calculate a difference ($L_{focal}$) between a binarized image and the flaw area image to correct a weight of the discriminative sub-network.

Specifically, as shown in FIG. 19, first, an inspection target image is input into the reconstructive sub-network to generate a flaw removal image (S901).

Next, the inspection target image and the flaw removal image are concatenated (S902), input into the discriminative sub-network and a flaw area image ($M_0$) of the same size as the product image is generated (S903).

Then, whether the flaw area image is defective ($\eta$) is calculated (S904).

$$\eta = \max(M_O * f) \qquad \text{[Equation 1]}$$

f is an average pooling filter. $M_0*f$ means average pooling applied to the flaw area image.

If the calculated defect value is less than a threshold ($\theta$), it is determined as normal product data and the model does not learn this (S905).

If the defect is greater than the threshold ($\theta$) it is determined as defective product data, and in this case, the flaw area image is binarized (S906) and the difference ($L_{focal}$) between the binarized image and the flaw area image is calculated (S907).

The weight of the discriminative sub-network is corrected using the calculated difference $L_{focal}$ (S908).

The apparatus and method for detecting defects using deep learning-based surface inspection according to the present disclosure described above uses normal images to train a model that removes flaws from the image, then selects defective images among the images determined by the model and improves inspection accuracy by supplementing the training performance with online learning.

The present disclosure allows to utilize the effects of both unsupervised learning and supervised learning by securing the performance of the defect detection model above a certain level through unsupervised learning, and supplementing the performance of the model with supervised learning-based online learning.

As described above, it will be understood that the present disclosure is implemented in a modified form without departing from the essential characteristics of the present disclosure.

Therefore, the specified embodiments should be considered from an illustrative rather than a restrictive perspective, and the scope of the present disclosure is indicated in the claims rather than the foregoing description, and all differences within the equivalent scope should be construed as being included in the present disclosure.

EXPLANATION OF SYMBOLS

100. Normal image-based unsupervised training unit
200. Defective image-based online supervised training unit

What is claimed is:

1. An apparatus for detecting defects using deep learning-based surface inspection, wherein an electronic device comprising at least one processor for detecting defects using deep learning-based surface inspection, comprises:
   a normal image-based unsupervised training unit configured to, based on a normal image, train a reconstructive sub-network which allows an original image to be obtained through an image with noise inserted, and a discriminative sub-network which allows detection of a noise area; and
   a defective image-based online supervised training unit configured to, based on a defective image, train a reconstructive sub-network which inputs an inspection target image to generate a flaw removal image, and a discriminative sub-network which extracts a flaw area image by comparing a difference between the inspection target image and the flaw removal image,
   wherein the normal image-based unsupervised training unit comprises:

an anomaly generation unit configured to insert noise into a normal product image to generate a defective product image;

a reconstructive sub-network calculation unit configured to convert the defective product image into a normal product image; and a discriminative sub-network calculation unit configured to extract a defective area by comparing a difference between the defective product image synthesized and the normal product image.

2. The apparatus of claim 1, wherein the anomaly generation unit comprises:

a Perlin noise generation unit configured to, when the normal product image is input, generate Perlin noise equal in size to the normal product image;

a noise area image extraction unit configured to extract a noise area image using a threshold; and a data synthesis unit configured to synthesize the normal product image and noise data.

3. The apparatus of claim 1, wherein the reconstructive sub-network calculation unit comprises:

a flaw removal image generation unit configured to receive the defective product image synthesized in the anomaly generation unit as an input to output a flaw removal image of the same size as the defective product image through reconstructive sub-network calculation;

an image difference calculation unit configured to calculate a difference between the flaw removal image and the normal product image; and an image concatenation unit configured to concatenate the flaw removal image and a defective image.

4. The apparatus of claim 1, wherein the discriminative sub-network calculation unit comprises:

a flaw area image generation unit configured to receive a defective product image and a normal product image concatenated as an input to generate a flaw area image of the same size as a product image through discriminative sub-network calculation;

an image difference calculation unit configured to calculate a difference between the flaw area image and a noise area image; and a weight correction unit configured to correct weights of the reconstructive sub-network and the discriminative sub-network, using differences calculated from the reconstructive sub-network and the discriminative sub-network, respectively.

5. An apparatus for detecting defects using deep learning-based surface inspection, wherein an electronic device comprising at least one processor for detecting defects using deep learning-based surface inspection, comprises:

a normal image-based unsupervised training unit configured to, based on a normal image, train a reconstructive sub-network which allows an original image to be obtained through an image with noise inserted, and a discriminative sub-network which allows detection of a noise area; and a defective image-based online supervised training unit configured to, based on a defective image, train a reconstructive sub-network which inputs an inspection target image to generate a flaw removal image, and a discriminative sub-network which extracts a flaw area image by comparing a difference between the inspection target image and the flaw removal image, wherein the defective image-based online supervised training unit comprises:

a reconstructive sub-network calculation unit configured to input the inspection target image to generate the flaw removal image;

a discriminative sub-network calculation unit configured to extract the flaw area image by comparing the difference between the inspection target image and the flaw removal image; and a defective product detection and training unit configured to calculate whether the flaw area image is defective, detect a defective product and train based on a threshold to perform binarization of the flaw area image, and calculate a difference between a binarized image and the flaw area image to correct a weight of the discriminative sub-network.

6. The apparatus of claim 5, wherein the reconstructive sub-network calculation unit comprises:

a flaw removal image generation unit configured to receive the inspection target image as an input to generate the flaw removal image; and an image concatenation unit configured to concatenate the inspection target image and the flaw removal image.

7. The apparatus of claim 5, wherein the discriminative sub-network calculation unit comprises:

a flaw area image generation unit configured to receive an inspection target image and a flaw removal image concatenated as an input to generate a flaw area image of the same size as a product image through discriminative sub-network calculation; and a defect calculation unit configured to calculate whether the flaw area image is defective.

8. The apparatus of claim 5, wherein the defective product detection and training unit comprises:

an image binarization unit configured to detect a defective product and train based on a threshold to perform binarization of the flaw area image;

an image difference calculation unit configured to calculate a difference between a binarized image and the flaw area image; and a weight correction unit configured to correct the weight of the discriminative sub-network based on the calculated difference between the binarized image and the flaw area image.

9. A method for detecting defects using deep learning-based surface inspection, wherein an operation for detecting defects using deep learning-based surface inspection is performed in an electronic device comprising at least one processor, the method comprising:

a normal image-based unsupervised training step of, based on a normal image, training a reconstructive sub-network which allows an original image to be obtained through an image with noise inserted, and a discriminative sub-network which allows detection of a noise area; and a defective image-based online supervised training step of, based on a defective image, training a reconstructive sub-network which inputs an inspection target image to generate a flaw removal image, and a discriminative sub-network which extracts a flaw area image by comparing a difference between the inspection target image and the flaw removal image, wherein the normal image-based unsupervised training step comprises:

an anomaly generating step of inserting noise into a normal product image to generate a defective product image;

a reconstructive sub-network calculating step of converting the defective product image into a normal product image; and a discriminative sub-network calculating step of extracting a defective area by comparing a difference between the defective product image synthesized and the normal product image.

10. The method of claim 9, wherein the anomaly generating step comprises:

a Perlin noise generating step of, when the normal product image is input, generating Perlin noise equal in size to the normal product image;

a noise area image extracting step of extracting a noise area image using a threshold; and a data synthesizing step of synthesizing the normal product image and noise data.

11. The method of claim 9, wherein the reconstructive sub-network calculating step comprises:

a flaw removal image generating step of receiving the defective product image synthesized in the anomaly generating step as an input to output a flaw removal image of the same size as the defective product image through reconstructive sub-network calculation;

an image difference calculating step of calculating a difference between the flaw removal image and the normal product image; and an image concatenating step of concatenating the flaw removal image and a defective image.

12. The method of claim 9, wherein the discriminative sub-network calculating step comprises:

a flaw area image generating step of receiving a defective product image and a normal product image concatenated as an input to generate a flaw area image of the same size as a product image through discriminative sub-network calculation;

an image difference calculating step of calculating a difference between the flaw area image and a noise area image; and a weight correcting step of correcting weights of the reconstructive sub-network and the discriminative sub-network, using differences calculated from the reconstructive sub-network and the discriminative sub-network, respectively.

13. A method for detecting defects using deep learning-based surface inspection, wherein an operation for detecting defects using deep learning-based surface inspection is performed in an electronic device comprising at least one processor, the method comprising:

a normal image-based unsupervised training step of, based on a normal image, training a reconstructive sub-network which allows an original image to be obtained through an image with noise inserted, and a discriminative sub-network which allows detection of a noise area; and a defective image-based online supervised training step of, based on a defective image, training a reconstructive sub-network which inputs an inspection target image to generate a flaw removal image, and a discriminative sub-network which extracts a flaw area image by comparing a difference between the inspection target image and the flaw removal image, wherein the defective image-based online supervised training step comprises:

a reconstructive sub-network calculating step of inputting the inspection target image to generate the flaw removal image;

a discriminative sub-network calculating step of extracting the flaw area image by comparing the difference between the inspection target image and the flaw removal image; and a defective product detecting and training step of calculating whether the flaw area image is defective, detect a defective product and train based on a threshold to perform binarization of the flaw area image, and calculate a difference between a binarized image and the flaw area image to correct a weight of the discriminative sub-network.

14. The method of claim 13, wherein the reconstructive sub-network calculating step comprises:

a flaw removal image generating step of receiving the inspection target image as an input to generate the flaw removal image; and an image concatenating step of concatenating the inspection target image and the flaw removal image.

15. The method of claim 13, wherein the discriminative sub-network calculating step comprises:

a flaw area image generating step of receiving an inspection target image and a flaw removal image concatenated as an input to generate a flaw area image of the same size as a product image through discriminative sub-network calculation; and a defect calculating step of calculating whether the flaw area image is defective.

16. The method of claim 13, wherein the defective product detecting and training step comprises:

an image binarization step of detecting a defective product and train based on a threshold to perform binarization of the flaw area image;

an image difference calculating step of calculating a difference between a binarized image and the flaw area image; and a weight correcting step of correcting the weight of the discriminative sub-network based on the calculated difference between the binarized image and the flaw area image.

\* \* \* \* \*